United States Patent
Chung et al.

(10) Patent No.: US 10,444,858 B2
(45) Date of Patent: Oct. 15, 2019

(54) CURSOR CONTROLLER AND TWO-DIMENSIONAL NAVIGATION MODULE THEREOF

(71) Applicant: PIXART IMAGING INC., Hsin-Chu (TW)

(72) Inventors: Ching-Lin Chung, Hsin-Chu (TW); Jr-Shen Yang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 15/725,664

(22) Filed: Oct. 5, 2017

(65) Prior Publication Data
US 2018/0032151 A1 Feb. 1, 2018

Related U.S. Application Data

(63) Continuation-in-part of application No. 15/087,507, filed on Mar. 31, 2016, now Pat. No. 10,061,404.

(30) Foreign Application Priority Data

Apr. 17, 2015 (TW) .............................. 104112384 A

(51) Int. Cl.
  *G06F 3/03* (2006.01)
  *G06F 3/0354* (2013.01)
  *G06F 1/16* (2006.01)
(52) U.S. Cl.
  CPC .......... *G06F 3/0317* (2013.01); *G06F 1/1652* (2013.01); *G06F 3/03543* (2013.01); *G06F 3/03544* (2013.01); *G06F 3/03548* (2013.01)

(58) Field of Classification Search
CPC ............... G06F 3/0354; G06F 3/03544; G06F 3/03548; G06F 3/03549; G06F 3/0362
See application file for complete search history.

(56) References Cited

U.S. PATENT DOCUMENTS

| | | | |
|---|---|---|---|
| 5,635,926 A * | 6/1997 | Li | G06F 3/0362 341/20 |
| D381,013 S * | 7/1997 | Allana | D14/408 |
| 6,275,215 B1 * | 8/2001 | Kim | G06F 3/03543 345/163 |
| 7,199,792 B2 | 4/2007 | Wang | |
| 7,616,188 B1 * | 11/2009 | Blandin | G06F 3/03543 345/163 |

(Continued)

*Primary Examiner* — Benjamin C Lee
*Assistant Examiner* — Dong Hui Liang
(74) *Attorney, Agent, or Firm* — Li & Cai Intellectual Property (USA) Office

(57) ABSTRACT

A two-dimensional navigation module of a cursor controller includes a top plate, a first rod, a sliding roller sleeved at the first rod, and a first OTS sensor. The top plate has an elongated groove recessed thereon. The first rod is arranged in the groove. Two opposite ends of the first rod are fastened to the top plate. The sliding roller is movable along the first rod between a first position and a second position, and the sliding roller is spinable along the first rod in a range of 0~360 degrees. When the sliding roller is moved, a center segment of the first rod keeps touching the sliding roller. The first OTS sensor is arranged under the center segment of the first rod for detecting at least one of a moving distance and a spinning angle of the sliding roller.

18 Claims, 11 Drawing Sheets

(56) References Cited

U.S. PATENT DOCUMENTS

| | | | | |
|---|---|---|---|---|
| 2002/0158844 A1* | 10/2002 | McLoone | ............ | G06F 3/0213 345/163 |
| 2004/0012568 A1* | 1/2004 | Velikov | ................ | G06F 1/1616 345/163 |
| 2005/0195698 A1* | 9/2005 | Flum | .................... | G10H 1/0091 369/30.27 |
| 2011/0037695 A1* | 2/2011 | Bor | ........................ | G06F 3/033 345/158 |
| 2013/0033420 A1* | 2/2013 | Nien | ....................... | G06F 1/169 345/156 |
| 2013/0099009 A1* | 4/2013 | Filson | ................ | G05D 23/1902 236/1 C |

* cited by examiner

CURSOR CONTROLLER AND TWO-DIMENSIONAL NAVIGATION MODULE THEREOF

CROSS REFERENCE TO RELATED APPLICATION

This application is a continuation-in-part of U.S. patent application Ser. No. 15/087,507 filed on Mar. 31, 2016 and entitled "OPTICAL NAVIGATION CHIP, OPTICAL NAVIGATION MODULE AND OPTICAL ENCODER" now pending.

BACKGROUND OF THE INVENTION

1. Field of the Invention

The present disclosure relates to a controller; in particular, to a cursor controller and a two-dimensional navigation module thereof 2. Description of Related Art The conventional controller (e.g., an optical mouse) is used to move on a carrying surface (e.g., a desktop), thereby controlling displacement and movement of a cursor. However, the conventional controller is limited to the above structure or operation, resulting in the conventional controller to be not easy to improve.

SUMMARY OF THE INVENTION

The present disclosure provides a cursor controller and a two-dimensional navigation module thereof to effectively improve the drawbacks associated with conventional controllers.

The present disclosure discloses a cursor controller, which includes a case, a first rod, a sliding roller, and a first optical tracking system (OTS) sensor. The case has an interior space, and the case has an elongated groove recessed on a top plate thereof. The first rod is arranged in the groove. Two opposite ends of the first rod are fastened to the top plate for maintaining the relative position between the first rod and the top plate. The sliding roller is sleeved at the first rod. The sliding roller is movable along the first rod between a first position and a second position, and the sliding roller is spinable along the first rod in a range of 0~360 degrees. When the sliding roller is moved at any position between the first position and the second position, a center segment of the first rod keeps touching the sliding roller. The first OTS sensor is arranged in the interior space of the case. The first OTS sensor is arranged under the center segment of the first rod for detecting at least one of a moving distance and a spinning angle of the sliding roller.

The present disclosure also discloses a two-dimensional navigation module of a cursor controller, which includes a top plate, a first rod, a sliding roller, and a first OTS sensor. The top plate has an elongated groove recessed thereon. The first rod is arranged in the groove. Two opposite ends of the first rod are fastened to the top plate for maintaining the relative position between the first rod and the top plate. The sliding roller is sleeved at the first rod. The sliding roller is movable along the first rod between a first position and a second position, and the sliding roller is spinable along the first rod in a range of 0~360 degrees. When the sliding roller is moved at any position between the first position and the second position, a center segment of the first rod keeps touching the sliding roller. The first OTS sensor is arranged under the center segment of the first rod for detecting at least one of a moving distance and a spinning angle of the sliding roller.

In summary, the cursor controller (or the two-dimensional navigation module) can be used to accurately control a cursor of a display by using the cooperation of the first rod, the sliding roller, and the first OTS sensor, so that the cursor controller (or the two-dimensional navigation module) needs not to detect an external object (e.g., a desktop) and is not limited to the conventional structure or operation.

In order to further appreciate the characteristics and technical contents of the present disclosure, references are hereunder made to the detailed descriptions and appended drawings in connection with the present disclosure. However, the appended drawings are merely shown for exemplary purposes, and should not be construed as restricting the scope of the present disclosure.

DETAILED DESCRIPTION OF THE PREFERRED EMBODIMENTS

Figure 1:
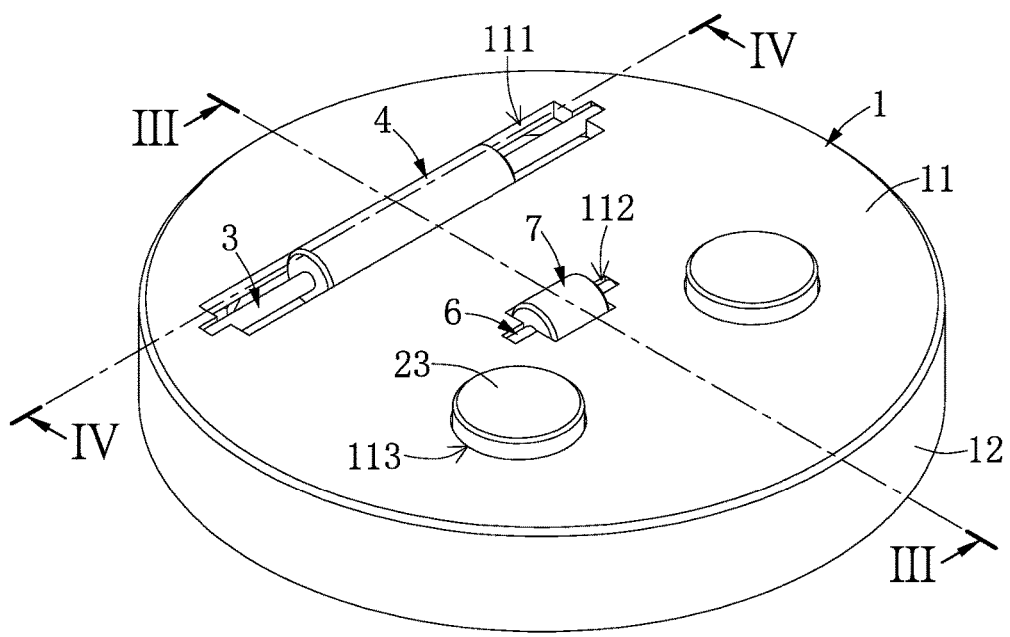
FIG. 1 is a perspective view showing a cursor controller according to a first embodiment of the present disclosure.

Reference is made to FIGS. 1 to 13, which illustrate the present disclosure. References are hereunder made to the detailed descriptions and appended drawings in connection with the present disclosure. However, the appended drawings are merely provided for exemplary purposes, and should not be construed as restricting the scope of the present disclosure.

[First Embodiment]

Reference is first made to FIGS. 1 to 6, which illustrate a cursor controller 100 according to a first embodiment of the present disclosure. The cursor controller 100 is configured to control a cursor of a display (not shown). In the present embodiment, the display can be a television, and the cursor controller 100 is a remote control, which is wirelessly connected to the television; or the display can be a screen of a computer, and the cursor controller 100 is a mouse (i.e., a flat portable mouse), which is wirelessly connected to the computer or is connected to the computer by a cable, but the present disclosure is not limited thereto. For example, in other embodiments of the present disclosure, the cursor controller 100 can be embedded in a notebook PC or a tablet PC for controlling a corresponding cursor.

As shown in FIGS. 1 to 4, the cursor controller 100 includes a case 1, a circuit assembly 2, a first rod 3, a sliding roller 4, a first optical tracking system (OTS) sensor 5, a second rod 6, a scroller 7, and a second OTS sensor 8. The following description discloses the structure and connection of each element of the cursor controller 100.

The case 1 includes a top plate 11, a surrounding side plate 12 perpendicularly connected to a periphery edge of the top plate 11, and a bottom plate 13 installed on the surrounding side plate 12. The case 11 has an interior space 14. The top plate 11 and the bottom plate 13 in the present embodiment are parallel to each other and each have a substantial round shape, so that the case 1 has a substantial flat structure. The surrounding side plate 12 having an annular structure is integrally connected to the periphery edge of the top plate 11, but the present disclosure is not limited thereto.

Figure 2:
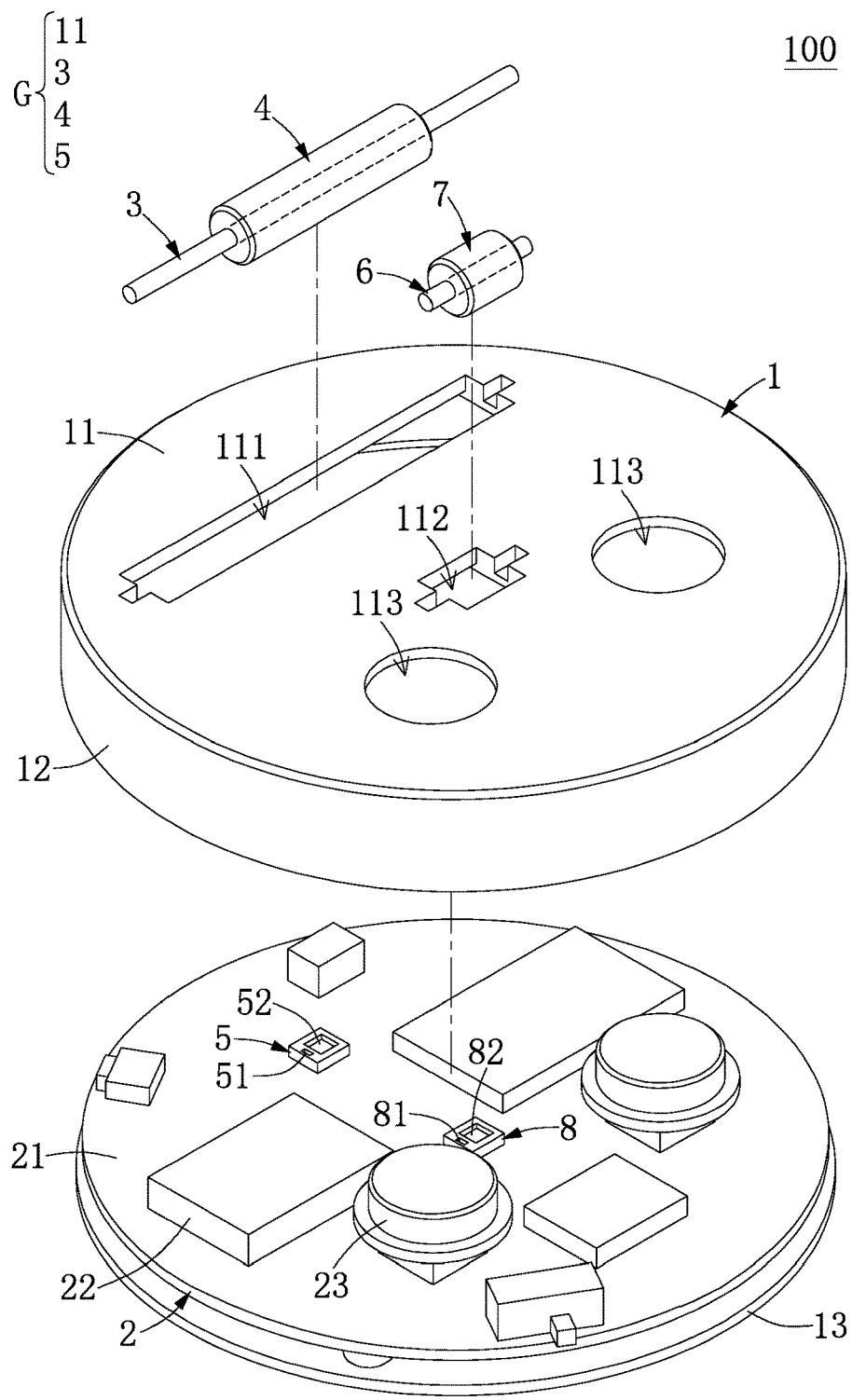
FIG. 2 is an exploded view of FIG. 1.

Specifically, the top plate 11 has an elongated groove 111, a trough 112, and two thru-holes 113. The longitudinal direction of the groove 111 is substantially parallel to that of the trough 112, and the length of the groove 111 is larger than that of the trough 112. The trough 112 in the present embodiment is approximately arranged at the center of the top plate 11, the groove 111 is arranged at one side of the trough 112 (i.e., the left side of the trough 112 as shown in FIG. 2), and the two thru-holes 113 are arranged at the other side of the trough 112 (i.e., the right side of the trough 112 as shown in FIG. 2). The groove 111 and the trough 112 in the present embodiment are penetratingly formed in the top plate 11.

The circuit assembly 2 is arranged in the interior space 14 of the case 1, and the components of the circuit assembly 2 in the present embodiment can be changed according to the designer's demand. For example, the circuit assembly 2 may include a circuit board 21, a plurality of electronic components 22 (e.g., a processor, a wireless receiver, a wireless emitter, and an electricity charger) mounted on the circuit board 21, and two button units 23 installed on the circuit board 21. The circuit board 21 is substantially parallel to the top plate 11 (or the bottom plate 13) of the case 1. The two button units 23 respectively pass through the two thru-holes 113 of the top plate 11, in other words, a part of each of the two button units 23 protrudes from the top plate 11 of the case 1.

The first rod 3 in the present embodiment is a round rod and is arranged in the groove 111 of the top plate 11. Two opposite ends of the first rod 3 are fastened to the top plate 11 for maintaining the relative position between the first rod 3 and the top plate 11. Moreover, the first rod 3 can be directly fastened to the top plate 11, or the first rod 3 can be fastened to the top plate 11 through other components, but the present disclosure is not limited thereto.

Figure 3:
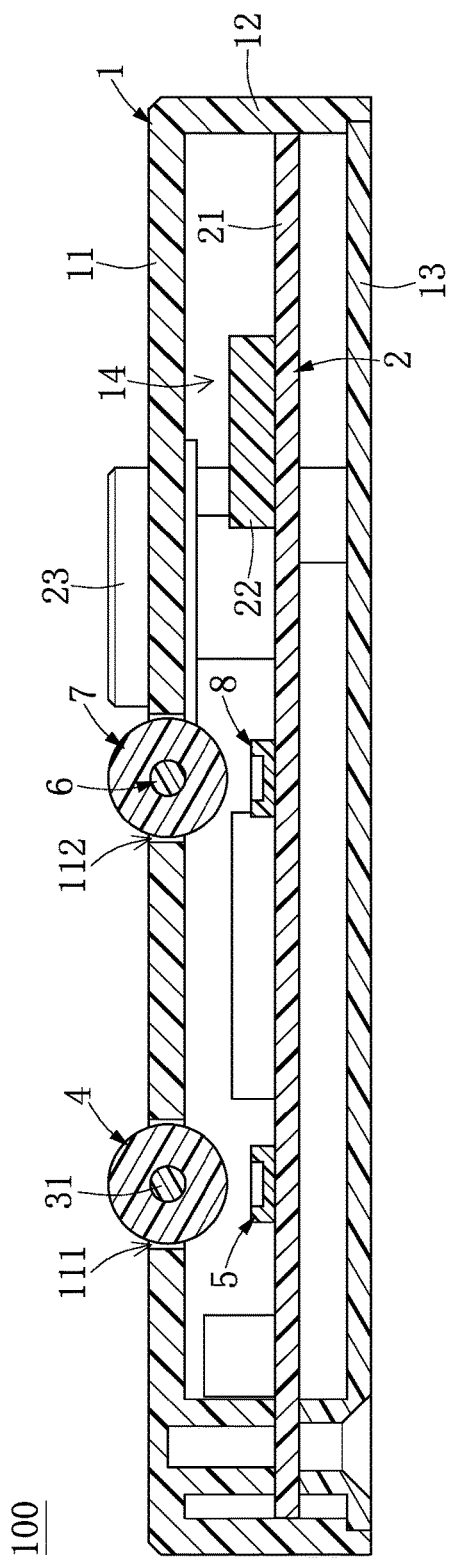
FIG. 3 is a cross-sectional view taken along a cross-sectional line of FIG. 1.
Figure 4:
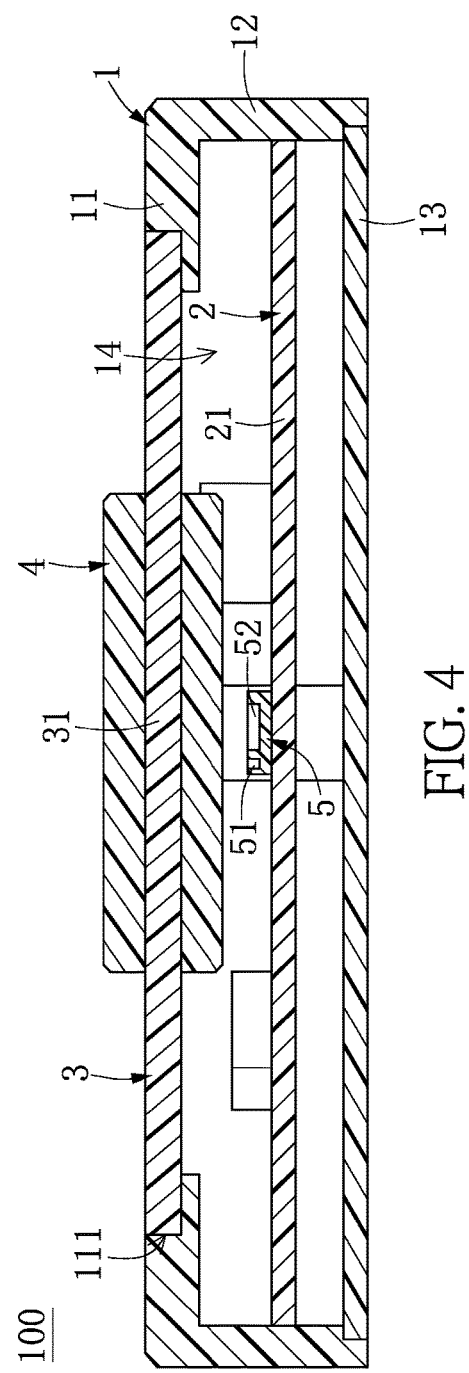
FIG. 4 is a cross-sectional view taken along a cross-sectional line IV-IV of FIG. 1.

The sliding roller 4 is sleeved at the first rod 3 and is approximately arranged in the groove 111. A part of the sliding roller 4 (i.e., the bottom part of the sliding roller 4 as shown in FIG. 3) passes through the groove 111 and is arranged in the interior space 14 of the case 1, and an opposite part of the sliding roller 4 (i.e., the top part of the sliding roller 4 as shown in FIG. 3) protrudes from the groove 111 of the top plate 11 for providing manipulation of a user.

In the present embodiment, the sliding roller 4 is a hollow round column. The inner diameter of the sliding roller 4 is substantially equal to the outer diameter of the first rod 3, the outer diameter of the sliding roller 4 is larger than the depth of the groove 111 (or the thickness of the top plate 11), and the length of the sliding roller 4 is larger than 50% of the length of the groove 111.

Figure 5:
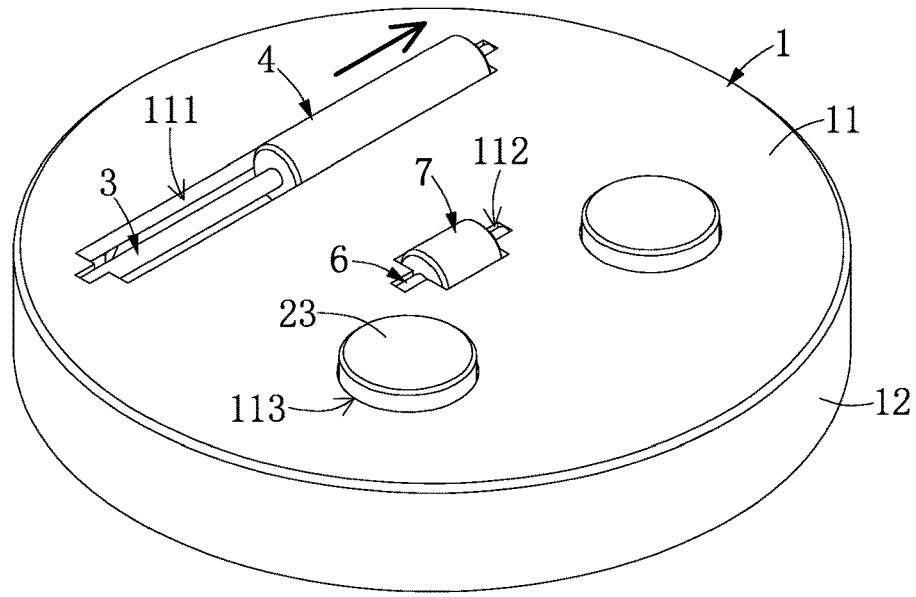
FIG. 5 is a perspective view showing the cursor controller when a roller is arranged at a first position.
Figure 6:
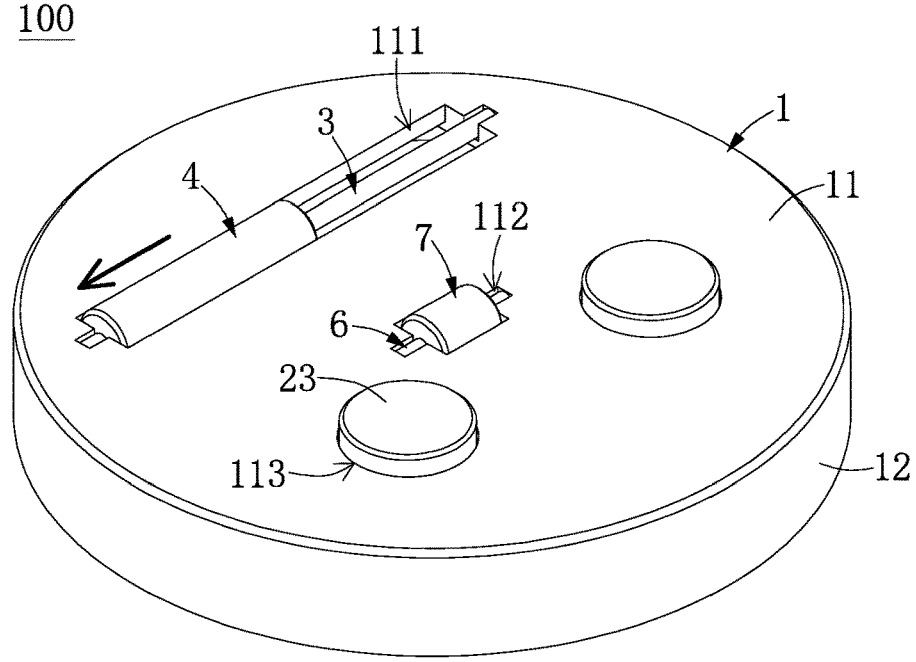
FIG. 6 is a perspective view showing the cursor controller when the roller is arranged at a second position.

Specifically, the sliding roller 4 is movable along the first rod 3 between a first position (as shown in FIG. 5) and a second position (as shown in FIG. 6), and the sliding roller 4 is spinable along the first rod 3 in a range of 0~360 degrees. Moreover, because the length of the sliding roller 4 is larger than 50% of the length of the groove 111, when the sliding roller 4 is moved at any position between the first position and the second position, a center segment 31 of the first rod 3 keeps touching the sliding roller 4.

The first OTS sensor 5 is fixed on the circuit board 21 and is arranged in the interior space 14 of the case 1. The first OTS sensor 5 is arranged under the center segment 31 of the first rod 3 for detecting at least one of a moving distance and a spinning angle of the sliding roller 4.

It should be noted that the cursor controller 100 in the present embodiment is provided without any lens arranged between the sliding roller 4 and the first OTS sensor 5, so that the thickness of the cursor controller 100 can be effectively reduced. Moreover, the first rod 3 and the sliding roller 4 are preferably detachable from the top plate 11, but the present disclosure is not limited thereto.

Specifically, the first OTS sensor 5 in the present embodiment includes a light emitting unit 51 and an optical navigation chip 52, and the light emitting unit 51 includes a laser diode or a light emitting diode. The light emitting unit 51 is configured to emit light onto the sliding roller 4 (i.e., the bottom part of the sliding roller 4, which touches the center segment 31 of the first rod 3), and the optical navigation chip 52 is configured to receive the light reflected by the sliding roller 4. Thus, the optical navigation chip 52 can immediately obtain a surface pattern of the sliding roller 4 according to the received light, and the circuit assembly 2 (i.e., the processor) can estimate each movement of the sliding roller 4 (i.e., the moving distance and the spinning angle) by analyzing the surface pattern transmitted from the optical navigation chip 52.

Moreover, the movement of the sliding roller 4 (i.e., the moving distance and the spinning angle) detected by the first OTS sensor 5 can be used to control the cursor of the display by the circuit assembly 2 (i.e., the circuit board 21, the processor, and the wireless emitter). Moreover, the cursor of the display can be controlled in different manners by using the movement of the sliding roller 4.

For example, the cursor controller 100 is configured to respectively transform the moving distance and the spinning angle of the sliding roller 4 detected by the first OTS sensor 5 into an X-direction movement and a Y-direction movement of the cursor of the display. Specifically, the movement (i.e., the moving distance and the spinning angle) of the sliding roller 4 can be transformed into dots per inch (DPI) or counts per inch (CPI) for controlling the movement of the cursor of the display.

The second rod 6 in the present embodiment is a round rod and is arranged in the trough 112 of the top plate 11. Two opposite ends of the second rod 6 are fastened to the top plate 11 for maintaining the relative position between the second rod 6 and the top plate 11. Moreover, the second rod 6 can be directly fastened to the top plate 11, or the second rod 6 can be fastened to the top plate 11 through other components, but the present disclosure is not limited thereto.

The scroller 7 is sleeved at the second rod 6 and is approximately arranged in the trough 112. A part of the scroller 7 (i.e., the bottom part of the scroller 7 as shown in FIG. 3) passes through the trough 112 and is arranged in the interior space 14 of the case 1, and an opposite part of the scroller 7 (i.e., the top part of the scroller 7 as shown in FIG. 3) protrudes from the trough 112 of the top plate 11 for providing a user manipulation.

In the present embodiment, the scroller 7 is a hollow round column. The inner diameter of the scroller 7 is substantially equal to the outer diameter of the second rod 6, and the outer diameter of the scroller 7 is larger than the depth of the trough 112 (or the thickness of the top plate 11). Specifically, the scroller 7 cannot be moved along the second rod 6, but the scroller 7 is spinable along the second rod 6 in a range of 0~360 degrees.

The second OTS sensor 8 is fixed on the circuit board 21 and is arranged in the interior space 14 of the case 1. The second OTS sensor 8 is arranged under the scroller 7 for detecting a spinning angle of the scroller 7.

It should be noted that the cursor controller 100 in the present embodiment is provided without any lens arranged between the scroller 7 and the second OTS sensor 8, so that the thickness of the cursor controller 100 can be effectively reduced. Moreover, the second rod 6 and the scroller 7 are preferably detachable from the top plate 11, but the present disclosure is not limited thereto.

Specifically, the second OTS sensor 8 in the present embodiment includes a light emitting unit 81 and an optical navigation chip 82, and the light emitting unit 81 includes a laser diode or a light emitting diode. The light emitting unit 81 is configured to emit light onto the scroller 7 (i.e., the bottom part of the scroller 7), and the optical navigation chip 82 is configured to receive the light reflected by the scroller 7. Thus, the optical navigation chip 82 can immediately obtain a surface pattern of the scroller 7 according to the received light, and the circuit assembly 2 (i.e., the processor) can estimate the spinning angle of the scroller 7 by analyzing the surface pattern transmitted from the optical navigation chip 82.

Moreover, the spinning angle of the scroller 7 detected by the second OTS sensor 8 can be used to control a page of the display by the circuit assembly 2 (i.e., the circuit board 21, the processor, and the wireless emitter).

For example, the cursor controller 100 is configured to transform the spinning angle of the scroller 7 detected by the second OTS sensor 8 into a Y-direction movement of the page of the display. Specifically, the spinning angle of the scroller 7 can be transformed into DPI or CPI for controlling the movement of the page of the display.

In addition, the top plate 11, the first rod 3, the sliding roller 4, and the first OTS sensor 5 in the present embodiment can be jointly defined as a two-dimensional navigation module G, and the applying manner and the cooperated components of the two-dimensional navigation module G are not limited to the present embodiment.

[Second Embodiment]

Figure 7:
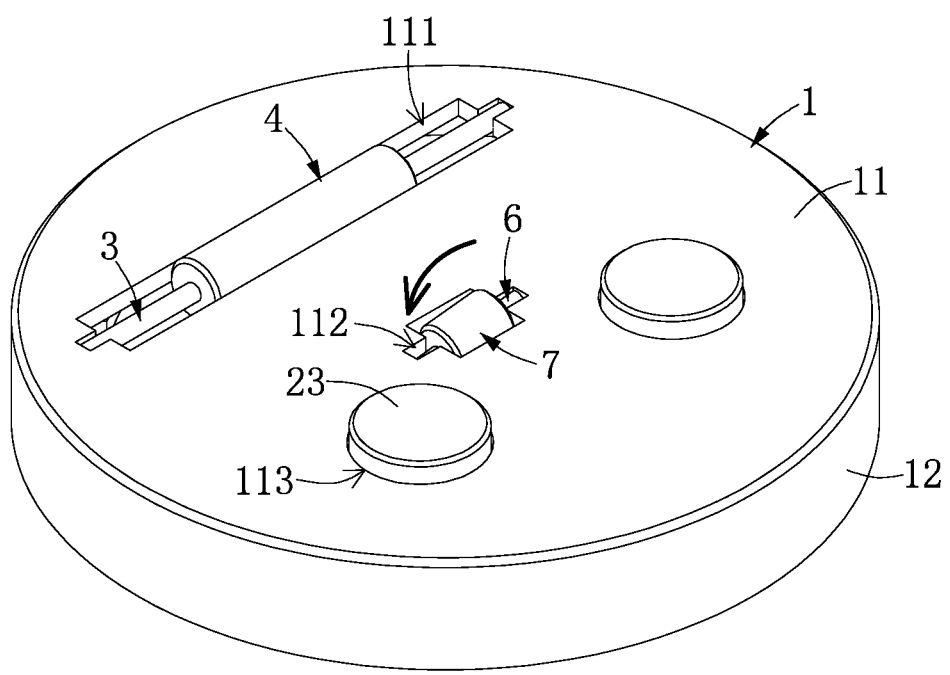
FIG. 7 is a perspective view showing the cursor controller according to a second embodiment of the present disclosure.

Reference is made to FIG. 7, which illustrates a second embodiment of the present disclosure. The second embodiment is similar to the first embodiment, and the difference between the two embodiments is disclosed as follows.

The scroller 7 in the present embodiment is tiltable with respect to the trough 112 of the top plate 11, and the second OTS sensor 8 is configured to detect a tilting angle of the scroller 7. Moreover, the structure provided for implementing the tiltable scroller 7 can be adjusted according to the designer's demand, and the present disclosure is not limited thereto.

[Third Embodiment]

Figure 8:
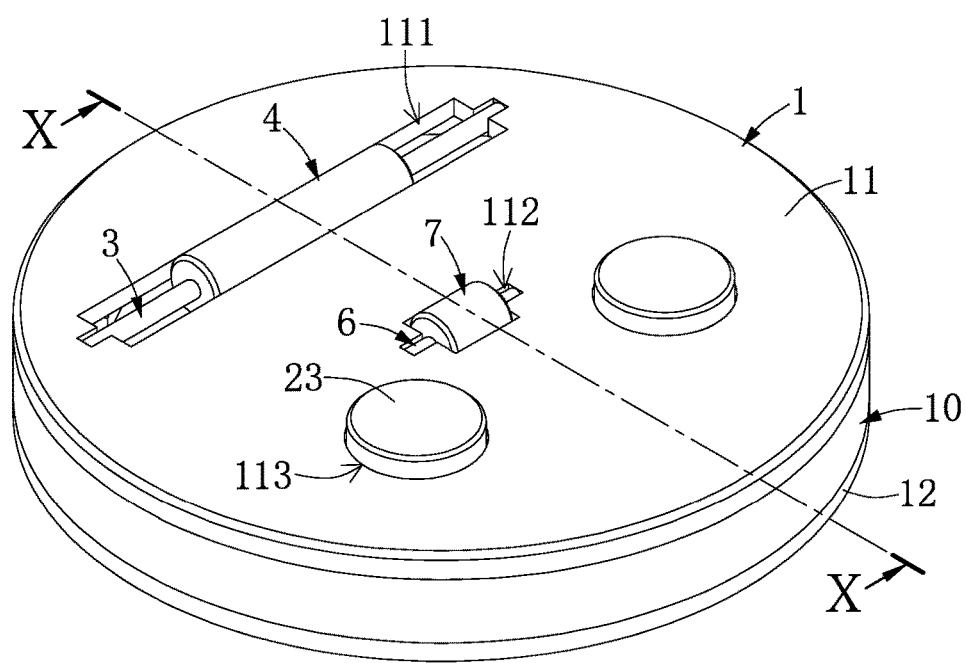
FIG. 8 is a perspective view showing the cursor controller according to a third embodiment of the present disclosure.
Figure 9:
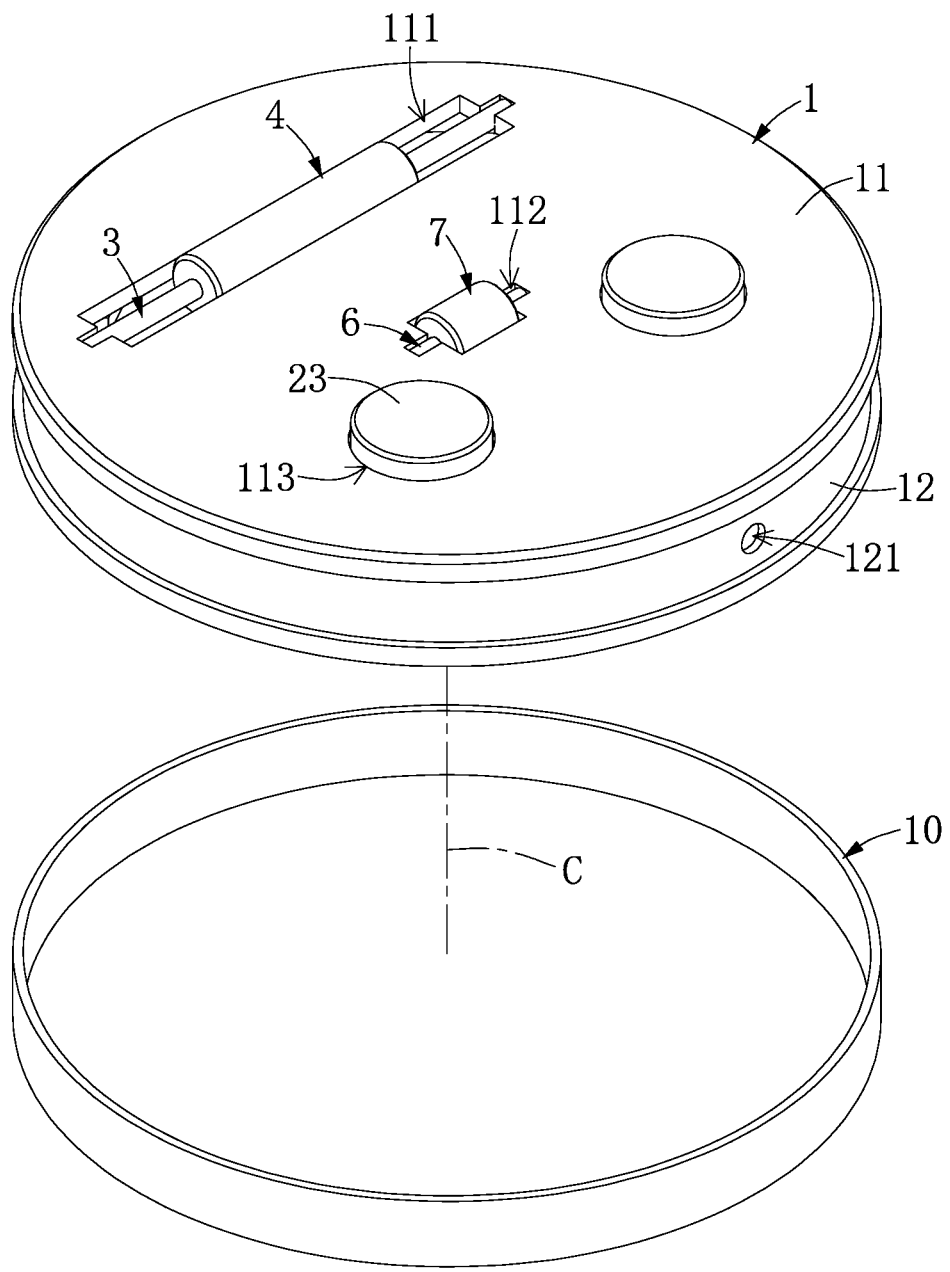
FIG. 9 is an exploded view of FIG. 8.
Figure 10:
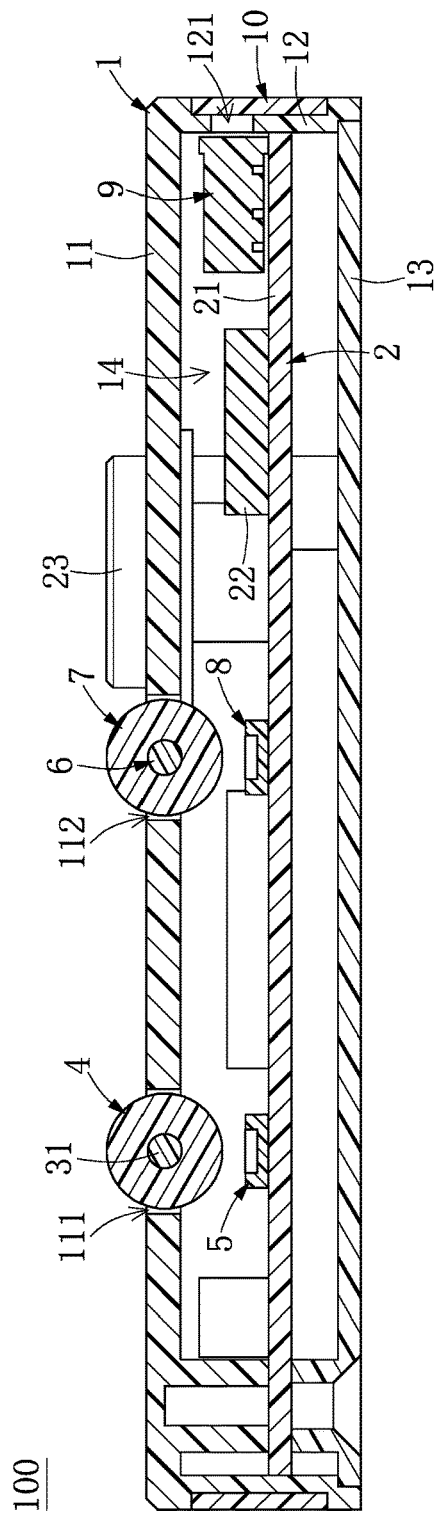
FIG. 10 is a cross-sectional view taken along a cross-sectional line X-X of FIG. 8.

Reference is made to FIGS. 8 to 10, which illustrate a third embodiment of the present disclosure. The third embodiment is similar to the first embodiment, and the difference between the two embodiments is disclosed as follows.

The cursor controller 100 in the present embodiment further includes a manipulating ring 10 and a side OTS sensor 9. Specifically, the case 1 has a detecting hole 121 formed on the surrounding side plate 12, and the manipulating ring 10 is rotatably arranged around the surrounding side plate 12 of the case 1 and covers the detecting hole 121. The center of a circle of the manipulating ring 10 is located at a central axis C perpendicular to the top plate 11, and the manipulating ring 10 is rotatabe along the central axis C. The side OTS sensor 9 is arranged in the interior space 14 and is corresponding in position to the detecting hole 121, and the side OTS sensor 9 is configured to detect a rotating angle of the manipulating ring 10 through the detecting hole 121.

Specifically, the side OTS sensor 9 in the present embodiment is similar to the first OTS sensor 5 and includes a light emitting unit (not shown) and an optical navigation chip (not shown), and the light emitting unit includes a laser diode or a light emitting diode. The light emitting unit is configured to emit light onto the inner surface of the manipulating ring 10, and the optical navigation chip is configured to receive the light reflected by the manipulating ring 10. Thus, the optical navigation chip can immediately obtain a surface pattern of the manipulating ring 10 according to the received light, and the circuit assembly 2 (i.e., the processor) can estimate the rotating angle of the manipulating ring 10 by analyzing the surface pattern transmitted from the optical navigation chip.

Moreover, the rotating angle of the manipulating ring 10 detected by the side OTS sensor 9 can be used to control the cursor of the display by the circuit assembly 2 (i.e., the circuit board 21, the processor, and the wireless emitter). The cursor of the display can be controlled in different manners by using the rotating angle of the manipulating ring 10, but the present disclosure is not limited thereto.

[Fourth Embodiment]

Figure 11:
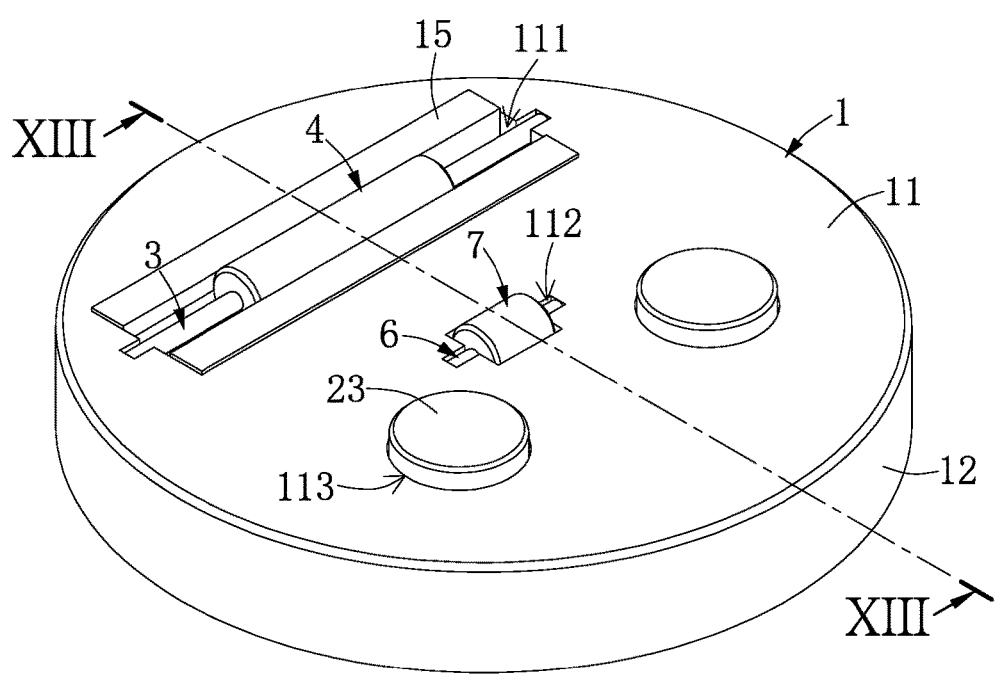
FIG. 11 is a perspective view showing the cursor controller according to a fourth embodiment of the present disclosure.
Figure 12:
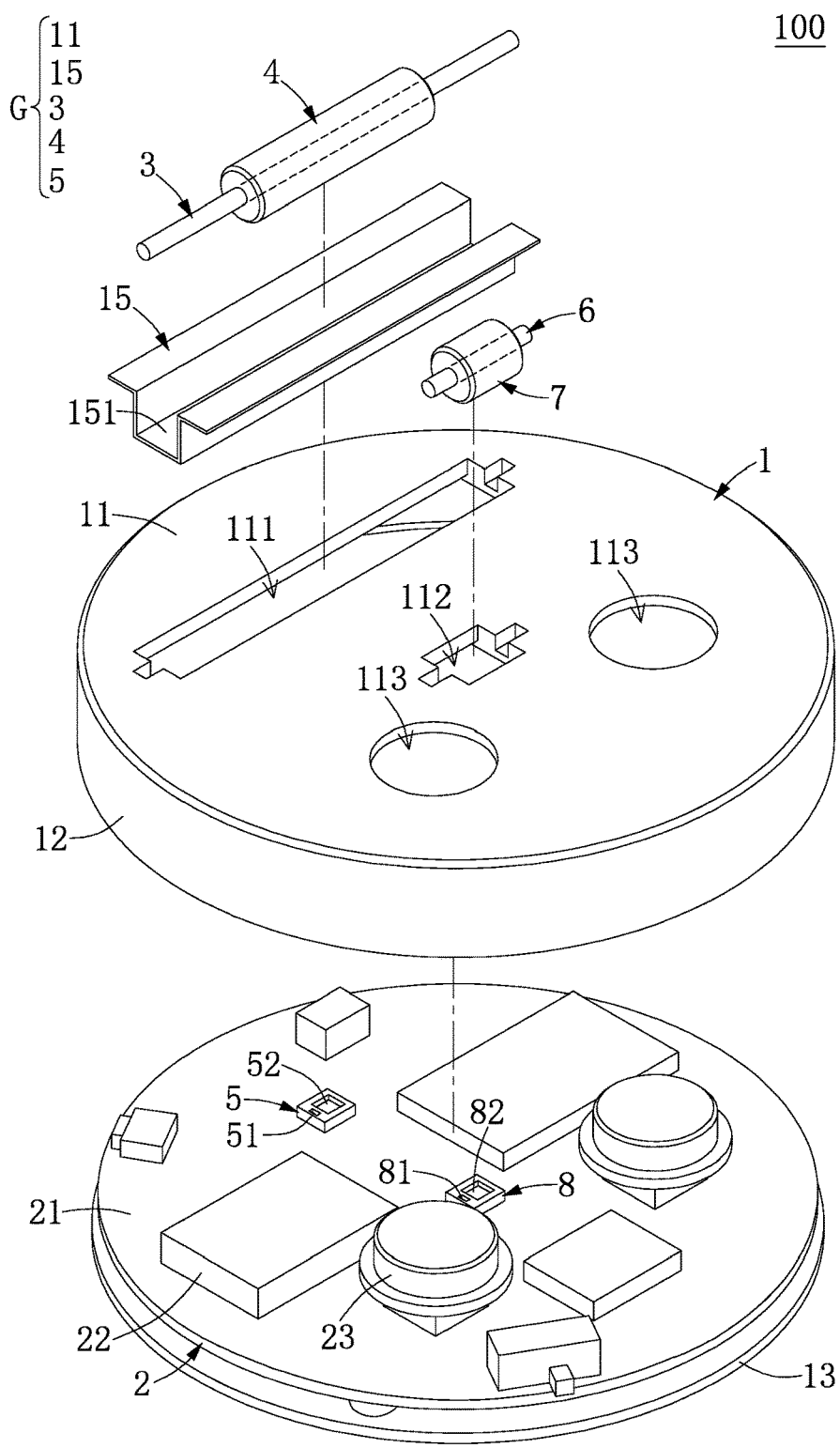
FIG. 12 is an exploded view of FIG. 11.
Figure 13:
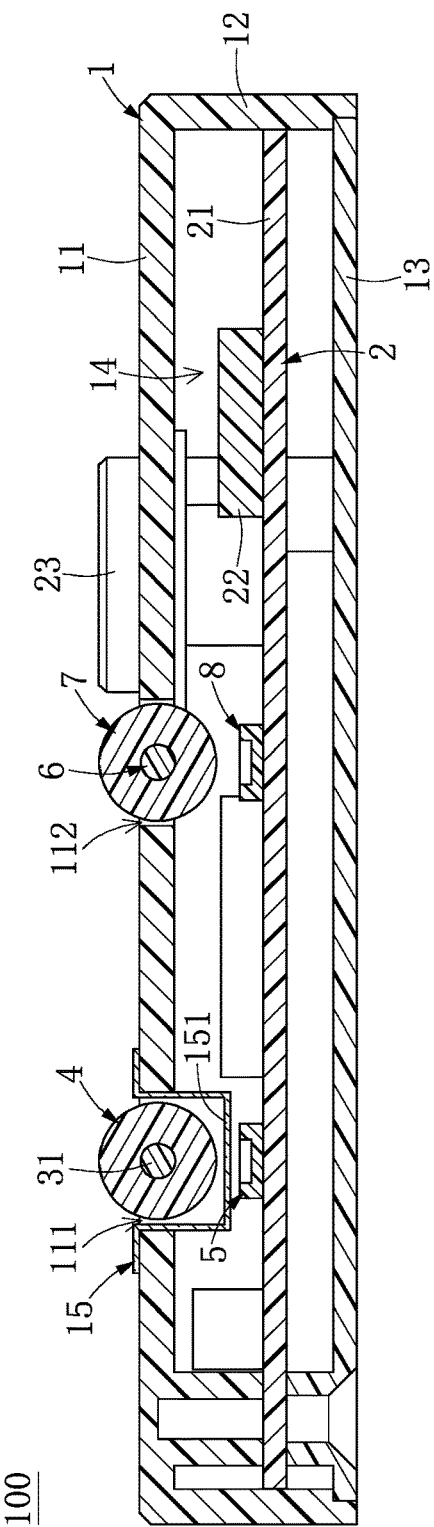
FIG. 13 is a cross-sectional view taken along a cross-sectional line of FIG. 8.

Reference is made to FIGS. 11 to 13, which illustrate a fourth embodiment of the present disclosure. The fourth embodiment is similar to the first embodiment, and the difference between the two embodiments is disclosed as follows.

The case 1 of the cursor controller 100 in the present embodiment further includes a partition 15 disposed on the top plate 11, and the two-dimensional navigation module G can be provided with the partition 15. Specifically, the partition 15 is arranged in the groove 111 and the interior space 14. A part of the sliding roller 4 (i.e., the bottom part of the sliding roller 4 as shown in FIG. 13) passes through the groove 111 and is movably arranged in the partition 15. The partition 15 has a translucent portion 151 arranged between the center segment 31 of the first rod 3 and the first OTS sensor 5. The translucent portion 151 is preferably transparent (or the partition 15 is transparent), so that light emitted from the first OTS sensor 5 can pass through the translucent portion 151 for detecting the first rod 3.

Accordingly, the interior space 14 of the case 1 can be separated from an outer space by using the partition 15, thereby preventing external liquid or dust from entering into the interior space 14 through the groove 111.

[The Effects of the Above Embodiments]

In summary, the cursor controller 100 (or the two-dimensional navigation module G) can be used to accurately control a cursor of a display by using the cooperation of the first rod 3, the sliding roller 4, and the first OTS sensor 5, so that the cursor controller 100 (or the two-dimensional navigation module G) needs not to detect an external object (e.g., a desktop) and is not limited to the conventional structure or operation.

Moreover, the interior space 14 of the case 1 in the present disclosure is separated from an outer space by using the partition 15, thereby preventing external liquid or dust from entering into the interior space 14 through the groove 111.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A cursor controller, comprising:
   a case having an interior space, wherein the case has an elongated groove recessed on a top plate thereof;
   a first rod arranged in the groove, wherein two opposite ends of the first rod are fastened to the top plate for maintaining the relative position between the first rod and the top plate;
   a sliding roller sleeved at the first rod, wherein the sliding roller is movable along the first rod between a first position and a second position, and the sliding roller is spinable along the first rod in a range of 0~360 degrees, wherein when the sliding roller is moved at any position between the first position and the second position, a center segment of the first rod keeps touching the sliding roller;
   a first optical tracking system (OTS) sensor arranged in the interior space of the case, wherein the first OTS sensor is arranged under the center segment of the first rod for detecting at least one of a moving distance and a spinning angle of the sliding roller; and
   a manipulating ring and a side OTS sensor, wherein the case has a detecting hole, the manipulating ring is rotatably arranged around the case and covers the detecting hole, the side OTS sensor is arranged in the interior space and is corresponding in position to the detecting hole, and the side OTS sensor is configured to detect a rotating angle of the manipulating ring through the detecting hole.

2. The cursor controller as claimed in claim 1, wherein the groove is penetratingly formed in the top plate, and a part of the sliding roller passes through the groove and is arranged in the interior space.

3. The cursor controller as claimed in claim 2, wherein the case further includes a partition, and the partition is disposed on the top plate and is arranged in the groove and the interior space, the part of the sliding roller is movably arranged in the partition, and the partition has a translucent portion arranged between the center segment of the first rod and the first OTS sensor.

4. The cursor controller as claimed in claim 3, wherein the partition is transparent.

5. The cursor controller as claimed in claim 1, further comprising a second rod, a scroller, and a second OTS sensor, wherein the case has a trough recessed on the top plate, the second rod is arranged in the trough, two opposite ends of the second rod are fastened to the top plate for maintaining the relative position between the second rod and the top plate, the scroller is sleeved at the second rod and is spinable along the second rod in a range of 0~360 degrees, and the second OTS sensor is arranged in the interior space and is arranged under the scroller for detecting a spinning angle of the scroller.

6. The cursor controller as claimed in claim 5, wherein the scroller is tiltable with respect to the trough, and the second OTS sensor is configured to detect a tilting angle of the scroller.

7. The cursor controller as claimed in claim 1, wherein the first OTS sensor includes a light emitting unit and an optical navigation chip, the light emitting unit is configured to emit light onto the sliding roller, and the optical navigation chip is configured to receive the light reflected by the sliding roller.

8. The cursor controller as claimed in claim 7, wherein the light emitting unit includes a laser diode or a light emitting diode.

9. The cursor controller as claimed in claim 1, further comprising two button units, wherein a part of each of the two button units protrudes from the top plate.

10. The cursor controller as claimed in claim 1, wherein the first rod and the sliding roller are detachable from the top plate.

11. The cursor controller as claimed in claim 1, wherein the cursor controller is configured to transform the moving distance of the sliding roller detected by the first OTS sensor into an X-direction movement of a cursor, and the cursor controller is configured to transform the spinning angle of the sliding roller detected by the first OTS sensor into a Y-direction movement of the cursor.

12. The cursor controller as claimed in claim 1, wherein the cursor controller is a flat portable mouse, and the case has a bottom plate substantially parallel to the top plate.

13. The cursor controller as claimed in claim 1, wherein the cursor controller is provided without any lens arranged between the sliding roller and the first OTS sensor.

14. A two-dimensional navigation module of a cursor controller, comprising:
    a top plate having an elongated groove recessed thereon;
    a first rod arranged in the groove, wherein two opposite ends of the first rod are fastened to the top plate for maintaining the relative position between the first rod and the top plate;
    a sliding roller sleeved at the first rod, wherein the sliding roller is movable along the first rod between a first position and a second position, and the sliding roller is spinable along the first rod in a range of 0~360 degrees, wherein when the sliding roller is moved at any position between the first position and the second position, a center segment of the first rod keeps touching the sliding roller;
    a first optical tracking system (OTS) sensor arranged under the center segment of the first rod for detecting at least one of a moving distance and a spinning angle of the sliding roller; and
    a partition disposed on the top plate, wherein the groove is formed by penetrating through the top plate, a part of the sliding roller passes through the groove, the partition is arranged in the groove, the part of the sliding roller is movably arranged in the partition, and the partition has a translucent portion arranged between the center segment of the first rod and the first OTS sensor.

15. The two-dimensional navigation module as claimed in claim 14, wherein the first OTS sensor includes a light emitting unit and an optical navigation chip, the light emitting unit is configured to emit light onto the sliding roller, and the optical navigation chip is configured to receive the light reflected by the sliding roller.

16. The two-dimensional navigation module as claimed in claim 15, wherein the light emitting unit includes a laser diode or a light emitting diode.

17. The two-dimensional navigation module as claimed in claim 14, wherein the first rod and the sliding roller are detachable from the top plate.

18. The two-dimensional navigation module as claimed in claim 14, wherein the two-dimensional navigation module is configured to transform the moving distance of the sliding roller detected by the first OTS sensor into an X-direction movement of a cursor, and the two-dimensional navigation module is configured to transform the spinning angle of the sliding roller detected by the first OTS sensor into a Y-direction movement of the cursor.

* * * * *